UNITED STATES PATENT OFFICE.

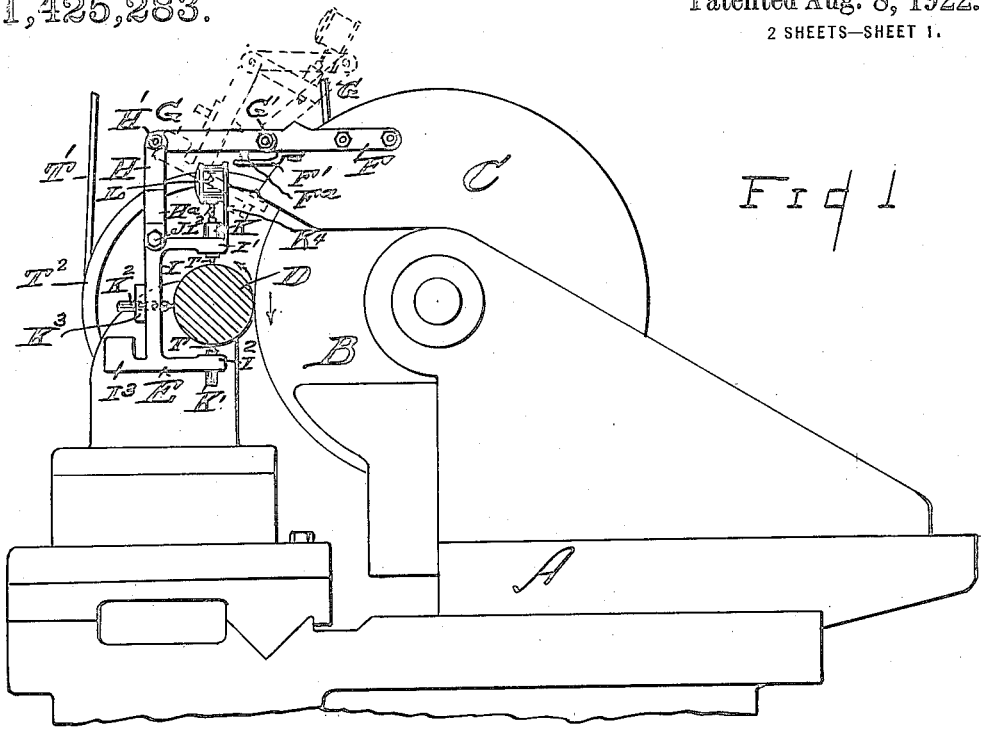
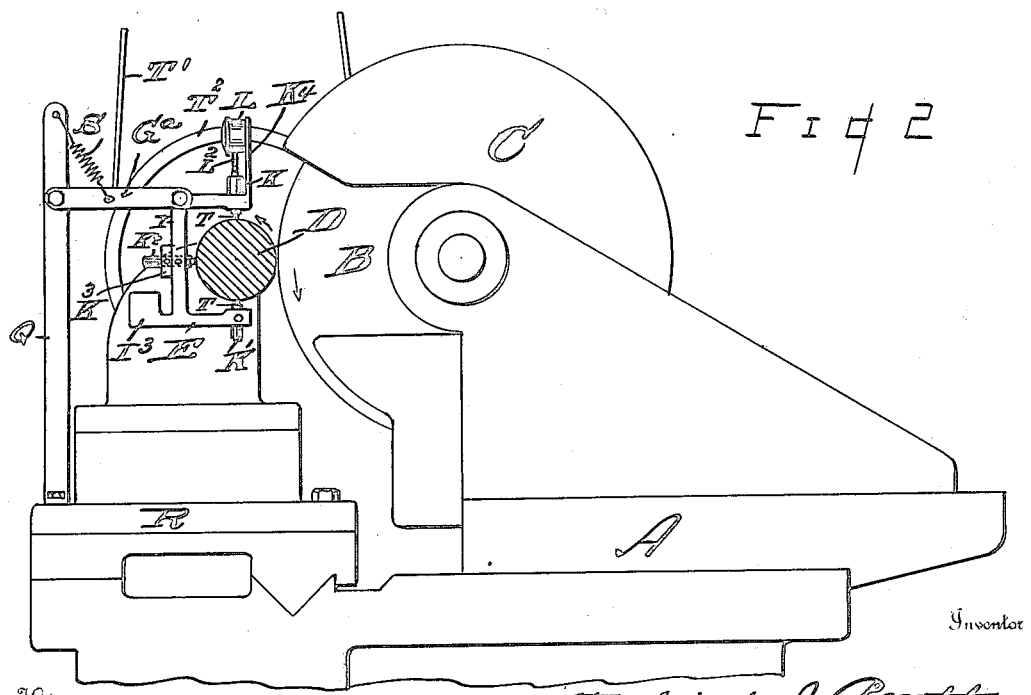

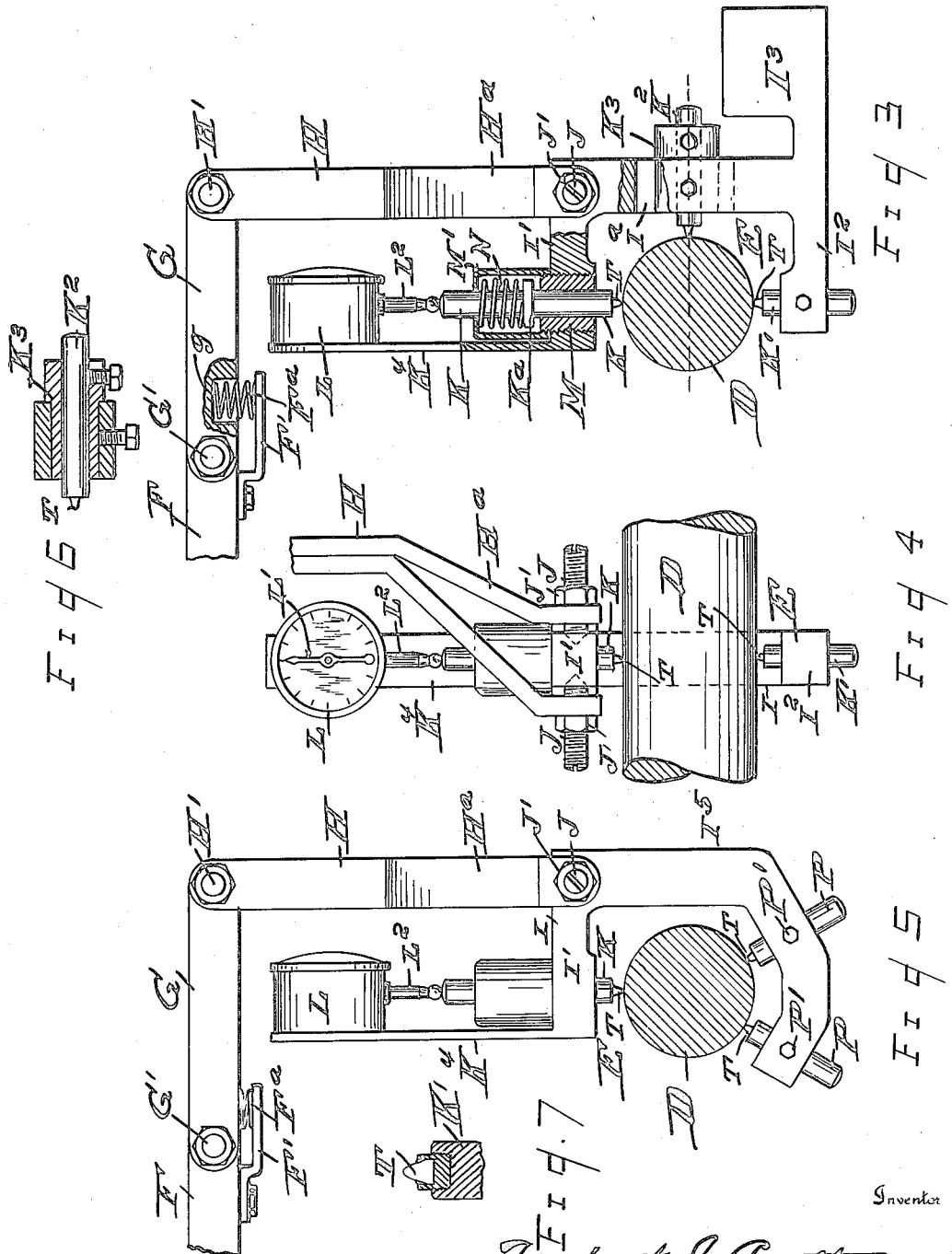

FREDERICK J. PRATT, OF DETROIT, MICHIGAN.

GRINDING GAUGE.

1,425,283.   Specification of Letters Patent.   Patented Aug. 8, 1922.

Application filed April 2, 1921. Serial No. 458,010.

*To all whom it may concern:*

Be it known that I, FREDERICK J. PRATT, citizen of the United States, residing at Detroit, county of Wayne, State of Michigan, have invented a certain new and useful Improvement in Grinding Gauges, and declare the following to be a full, clear, and exact description of the same, such as will enable others skilled in the art to which it pertains to make and use the same, reference being had to the accompanying drawings, which form a part of this specification.

My invention relates to a gauge for automatically measuring straight or tapered spindles, shafts, rolls, or other element of like character.

One of the objects of the invention is to provide a device which will insure accuracy of measurement throughout the entire length of the element calipered while the latter is being ground to size.

A further object of the invention is to increase production due to the speed with which articles may be ground without stopping the grinding machine to take measurements.

A further object is to provide a device so mounted that it may maintain its proper relation to the article being ground throughout the entire period of grinding.

A further object is to provide a device which may be swung out of the way to remove or replace the article to be ground.

A further object of the invention is to provide against any appreciable wear,—even after long periods of service in traversing the periphery of the element to be calipered—by employing diamonds, sapphires, or the like for stylus points.

A further object in constructing the stylus points of diamonds, or the like is that they are adapted to break through the fluid film covering the surface of the element being ground that an exact measurement may be obtained without cutting or scratching the surface of the element measured.

A further object is to provide means whereby the stylus points may be made interchangeable for use on gauges of various sizes.

With the foregoing and other objects in view which will appear as the description proceeds the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a fragmentary end elevation of a grinding machine showing the article to be ground in contact with the grinding wheel, and the gauge in position to caliper the article to be ground,—indicating also in dotted lines the position of the gauge when raised for the removal or replacement of the article to be ground.

Figure 2 is a similar end elevation of a modification of the device in which the gauge is mounted on a movable bed carrying the article to be ground whereby it may be adapted to caliper tapered spindles, or the like.

Figure 3 is an enlarged detail view of the device with parts in section showing diagrammatically the article to be ground in position.

Figure 4 is an end elevation at right angles to that indicated in Figure 3.

Figure 5 is a view of a modification of the device.

Figure 6 is a horizontal sectional view taken on or about line 6—6 of Figure 3, showing the manner of supporting the adjustable diamond or stylus mounting.

Figure 7 is a detail of a removable stylus point.

A, indicates a grinding machine, B, denotes a grinding wheel, C, the usual hood or wheel guard covering the grinding wheel. D, denotes an article being ground. E, denotes a gauge in position to caliper the element being ground.

The device as shown in Figure 1 is suspended by an arm F, bolted to the wheel guard C. G, is a bar pivoted at G' to the arm F. F' is a bracket bolted to the arm F on which rests a spring F$^a$, extending up into a recess $g$ formed in the bar G, the purpose of the spring being to yieldingly support the bar G in a substantially horizontal position. H, is a depending arm pivoted at H' to the bar G terminating below in an offset yoke-shaped portion H$^a$. I, is a casting supported in the yoke-shaped member by a pair of oppositely disposed pivot bolts J, J, extending through the arms of the yoke. J' are nuts to secure the pivot bolts when properly adjusted. The casting I is provided with upper and lower lateral extensions I' and I² adapted to project above and below the article to be ground. Supported in the extensions I' and I² are pins K, K', fitted with what are known as "lapped" diamonds T, sapphires or the like.

As shown in Figure 1 the pins K and K'—fitted with diamonds—are located diametrically opposite each other, and in a plane intersecting the longitudinal axis of the element to be ground. K², is a like pin fitted with a diamond supported in the vertical member of the casting I, and midway between the pins K and K'. I³, denotes a weighted lateral extension of the casting I, which serves to maintain the diamond point of the pin K², in contact with the element being ground. K⁴ indicates a bracket arm extending upwardly from the lateral extension I' of the casting for supporting a gauge L, of usual construction provided with a rotatable pointer L' operated by the vertical movement of a depending finger L² extending through the casing of the gauge. M, is a bushing screwed into the lateral extension I' of the casting I and projecting above the surface of the latter supports a cap M' screwed thereon. N, indicates a spring sleeved on the pin K adapted to bear at one end upon a collar Kᵃ carried by the pin and at the other against the wall of the cap M' to yieldingly force the diamond carried by the pin into impinging contact with the periphery of the element being ground. The pin K extends through the cap to receive the thrust of the depending finger L² of the gauge, whereby the movement of the pin may be communicated to the rotatable pointer L' of the latter. The pin K² is supported in a bushing K³ adapted for vertical adjustment in a slot Iᵃ formed in the casting I,—thus the pin may be adjusted for measuring elements of various diameters,—the pin being set on a plane intersecting the central longitudinal axis of the element to be ground.

In Figure 2 is shown a method of mounting the gauge to adapt it for use in grinding tapering spindles, cones, or the like;—the upright member Q for supporting the gauge being bolted to the adjustable bed plate R, of the grinding machine. To the member Q is pivoted an arm Gᵃ from which the casting I is suspended. S, indicates a spring engaging the arm Gᵃ and the upright member Q to yieldingly support the arm Gᵃ in a substantially horizontal position. T² is a pulley for rotating the element to be ground and T' is the belt for driving the pulley. In the modification shown in Figure 5 the diamond supporting pins P, P, are mounted beneath the element to be ground. The pins are adjustably supported in the casting I by suitable set screws P'—the casting I⁵ being pivoted to the yoke-shaped member Hᵃ which is in turn suspended from the arm Gᵃ, as previously described.

Having now indicated the several parts by reference letters the construction and operation of the device will be readily understood.

The gauge supporting frame is first tilted back to the position indicated in dotted lines in Figure 1 and a template or master element of the predetermined gauge required is mounted in the grinding machine. The gauge is then shifted to the position indicated in full lines in Figure 1,—that the oppositely disposed diamond points of the pins K and K' may impinge upon the surface of the template on a plane intersecting its longitudinal axis. The pin K² is then adjusted in the vertical member of the casting I, midway between the pins K and K',—the pins being then secured against accidental displacement by their respective set screws. It will be understood that in adjusting the several pins to the periphery of the template care should be exercised to insure the rotatable pointer L' of the gauge L registering at zero, it being evident that when the element to be ground is inserted in the grinding machine in place of the template the pointer will move from its zero position to a point indicating the relatively greater diameter of the element to be ground. The gauge having been properly adjusted, it is again shifted to the position indicated in dotted lines—the template is then removed from the grinding machine that it may be replaced by the element to be ground. The gauge is then returned to its former position as indicated in full lines, and power applied to actuate the grinding wheel, the operator taking careful note of the gauge reading as it gradually registers the diminishing diameter of the element being ground. In Figure 1 it will be noted that while the element to be ground is rotated in the usual direction it reciprocates in front of the grinding wheel that the diameter may be uniform throughout its length. Upon the gauge pointer registering "zero" the grinding machine is stopped that the operator may remove the element which is then the exact diameter of the template. The gauge supporting frame is then swung to the position indicated in dotted lines and the work removed to be replaced by another element to be ground,—whereupon the operation just described is repeated.

If the element to be ground is of cone-shape a template of proper form is first fitted in a grinding machine provided with an adjustable bed as indicated in Figure 2. In this case the gauge is supported from the adjustable bed that it may travel with the element to be ground as the latter passes across the face of the grinding wheel. In adjusting a cone-shaped element to the grinding wheel the bed-plate carrying the element to be ground is shifted so that the peripheral surface of the cone-template coincides with the grinding edge of the wheel. The gauge is then applied to the cone-template at any arbitrary distance from its end. The element to be ground is then installed in the machine in place of the template,— the gauge being at the same distance from its end as in the case of the cone-template. Thus when the diameter of the cone is reduced through the abrasion of the grinding wheel to a point where the pointer again registers "zero" it will be found that the cone-shaped element will exactly coincide with the size of the cone-template.

It will now be apparent that in grinding "cylinders" the gauge is supported upon a fixed part of the frame so that the element ground may be calipered from end to end, as it reciprocates back and forth in front of the grinding wheel;—while in grinding cone-shaped elements the gauge is supported by the traveling bed in which the cone-shaped element is mounted, that the gauge may be maintained in the same relation to the end of the cone as the latter traverses back and forth in front of the grinding wheel.

As previously indicated I have found in practice that by employing a diamond to caliper the element being ground the fluid film upon the surface of the latter is cut through without scratching or injuring the surface of the element being ground,—thus an exact measurement of the element may be obtained at all times during the progress of the work. It has also been learned by actual practice that a gauge so constructed is capable of automatically and accurately measuring the rotating surface traversed— without appreciable wear—for a long period of time.

Having thus described my invention what I claim is:—

1. In a device of the character described; a member adapted to partially encircle the element to be measured; a yieldable support adapted for attachment to a grinding machine, in which said member is pivoted; a plurality of adjustable elements mounted in said member adapted to impinge upon the element to be measured; an indicating gauge; a yieldable stylus adapted to bear upon the element to be measured and cooperating with the gauge to effect a gauge reading; and a gem-stone fitted to the end of the stylus to co-operate with the adjustable elements to determine the diameter of the element measured.

2. In a device of the character described; a member adapted to partially encircle the element to be measured; a yieldable support adapted for attachment to a grinding machine, to which said member is pivoted; a plurality of adjustable elements mounted in said member; a diamond mounted in the end of each of said elements, to impinge upon the surface of the element to be measured; a gauge including a pointer and a projecting finger; a spring actuated stylus adapted to co-operate with the gauge to effect a gauge reading; and a diamond fitted in the end of the stylus adapted to co-operate with the diamonds of the adjustable elements to determine the diameter of the element measured.

3. In a device of the character described; a supporting arm; a casting pivoted to the arm; a plurality of adjustable pins supported in the casting; means for securing the pins when adjusted; a diamond mounted in the end of each pin; a movable spring actuated stylus supported in the casting; a diamond fitted in the end of the stylus; an indicating gauge including a pointer and a projecting finger, adapted to be actuated by the stylus to effect a gauge reading.

4. In a device of the character described; a supporting arm, a spring for normally maintaining the arm in a substantially horizontal position; a casting pivoted to the arm; a plurality of adjustable pins supported in the casting; a diamond mounted in the end of each pin; means for securing the pins when adjusted; a movable stylus supported in the casting; a diamond mounted in the end of the stylus; a spring adapted to act upon said stylus to force it into impinging relation with the element to be measured, and a gauge provided with a pointer and a projecting finger adapted to bear upon the end of the stylus, whereby a gauge reading may be obtained.

5. In a device of the character described, a hinged supporting arm, a spring for normally maintaining the arm in a substantially horizontal position, a casting adapted to partially encircle the element to be measured, a plurality of pins supported in the casting, a gem-stone detachably supported in the end of each of the pins, a gauge including a pointer, and a movable stylus fitted with a gem-stone adapted to co-operate with the gauge to effect a reading.

6. In a device of the character described; a hinged supporting arm; a casting suspended from the arm adapted to partially encircle the element to be measured, said casting provided with a weighted lateral extension; a plurality of pins fitted with detachable gem stones supported in the casting; an indicating device including a pointer and a movable spring actuated stylus fitted with a gem stone adapted to co-operate with the indicating device to effect a reading.

In testimony whereof, I sign this specification in the presence of two witnesses.

FREDERICK J. PRATT.

Witnesses:
S. E. THOMAS,
IDA GOREN.